(12) United States Patent
Takahara

(10) Patent No.: US 7,864,781 B2
(45) Date of Patent: Jan. 4, 2011

(54) INFORMATION PROCESSING APPARATUS, METHOD AND PROGRAM UTILIZING A COMMUNICATION ADAPTER

(75) Inventor: Koji Takahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 854 days.

(21) Appl. No.: 11/062,675

(22) Filed: Feb. 22, 2005

(65) Prior Publication Data

US 2005/0281258 A1 Dec. 22, 2005

(30) Foreign Application Priority Data

Jun. 18, 2004 (JP) .............................. 2004-180940

(51) Int. Cl.
*H04L 12/28* (2006.01)
(52) U.S. Cl. .................................. 370/395.54; 370/466
(58) Field of Classification Search ....................... None
See application file for complete search history.

(56) References Cited

U.S. PATENT DOCUMENTS

| | | | |
|---|---|---|---|
| 6,578,122 B2* | 6/2003 | Beukema et al. ............. 711/163 |
| 6,594,712 B1* | 7/2003 | Pettey et al. .................... 710/22 |
| 6,681,262 B1* | 1/2004 | Rimmer ....................... 709/250 |
| 6,690,757 B1* | 2/2004 | Bunton et al. ................ 375/371 |
| 6,831,916 B1* | 12/2004 | Parthasarathy et al. ....... 370/359 |
| 6,834,332 B2* | 12/2004 | Craddock et al. ............ 711/159 |
| 6,839,794 B1* | 1/2005 | Schober ........................ 710/316 |
| 6,854,032 B2* | 2/2005 | Dearth et al. .................... 711/2 |
| 6,856,619 B1* | 2/2005 | Haugseth et al. ............. 370/389 |
| 6,859,867 B1* | 2/2005 | Berry ........................... 711/206 |
| 6,961,347 B1* | 11/2005 | Bunton et al. ................ 370/465 |
| 6,988,150 B2* | 1/2006 | Matters et al. ................. 710/36 |
| 7,149,817 B2* | 12/2006 | Pettey ........................... 709/250 |
| 2003/0046474 A1* | 3/2003 | Craddock et al. ............ 710/308 |
| 2004/0081394 A1* | 4/2004 | Biran et al. ..................... 385/31 |
| 2005/0238052 A1* | 10/2005 | Yamazaki ..................... 370/469 |
| 2006/0236063 A1* | 10/2006 | Hausauer et al. ............. 711/170 |

(Continued)

OTHER PUBLICATIONS

Sur, S. Vishnu, A. Jin, H.-W. Panda, D.K. Huang, W. ; Can memoryless network adapters benefit next-generation infiniband systems? ; Aug. 17, 2005, IEEE, 13th Symposium on High Performance Interconnects, 2005. Proceedings, pp. 45-50.*

(Continued)

*Primary Examiner*—Jayanti K Patel
*Assistant Examiner*—Hooman Houshmand
(74) *Attorney, Agent, or Firm*—Fujitsu Patent Center

(57) ABSTRACT

One aspect of the embodiments utilizes an information processing apparatus connected to another information processing apparatus via a transmitting path. An embodiment includes a communication request generation unit generating a communication request to the other information processing apparatus, a network management unit outputting a first data having an address of a first form to the other information processing apparatus based on the communication request, and a sending unit sending the second data to the transmitting path. The address converting unit converts the first data that the network management unit has output to second data including an address of a second form and outputs the second data when the address converting unit has received a sending request of the first data from the network management unit or when designated time has elapsed before receiving the sending request of the first data from the network management unit.

3 Claims, 9 Drawing Sheets

U.S. PATENT DOCUMENTS

2008/0056277 A1* 3/2008 Sharma ................. 370/395.53
2009/0073999 A1* 3/2009 Craddock et al. ........... 370/412
2009/0141734 A1* 6/2009 Brown et al. ................. 370/419
2009/0150641 A1* 6/2009 Flynn et al. ................. 711/202

OTHER PUBLICATIONS

InfiniBand™ Architecture Specification vol. 1, Release 1.0. a, Chapter 3: Architectural Overview Sep. 26, 2000, pp. 1-37, 61-114.

* cited by examiner

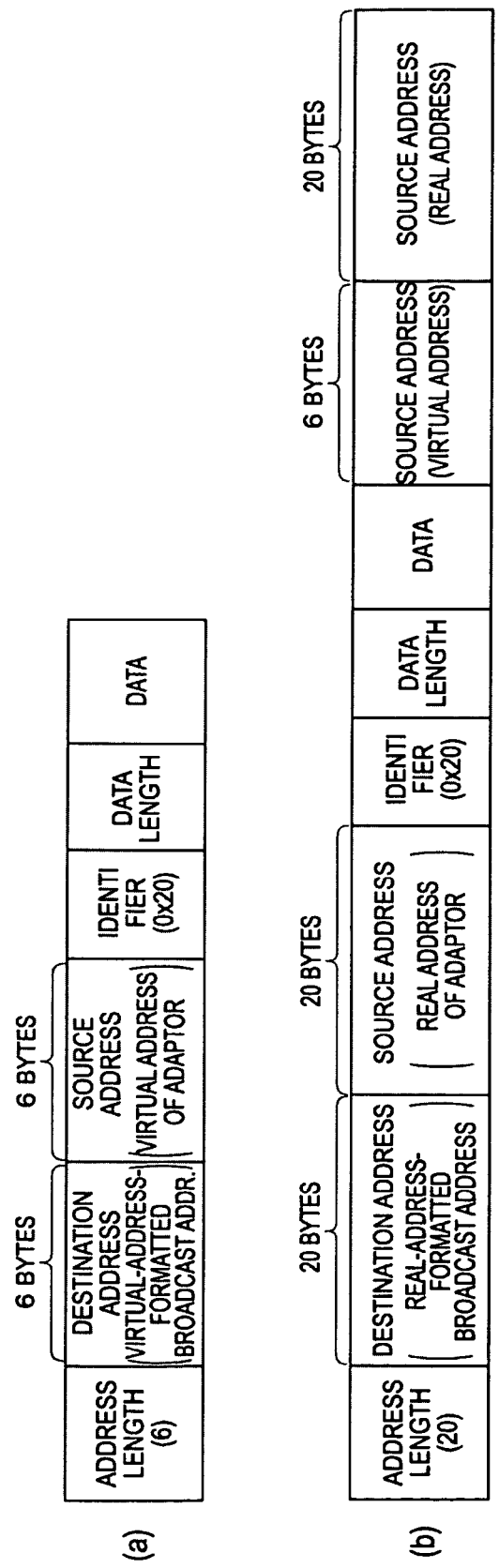

INFORMATION PROCESSING APPARATUS, METHOD AND PROGRAM UTILIZING A COMMUNICATION ADAPTER

BACKGROUND OF THE INVENTION

1. Field of the Invention

The present invention relates to an address translation program, a program utilizing method, an information processing device and a readable-by-computer medium.

2. Description of the Prior Art

At the present time, among computers utilized in enterprises, etc., there exist a computer 30 including, as schematically shown in FIGS. 10(a) and 10(b), a single piece or two pieces of InfiniBand adapters 25 (InfiniBand is a trademark of InfiniBand Trade Association) and is preinstalled with an application program 21, a network management program 22, an address translation program 23, an Infiniband driver 24, etc. . . .

The InfiniBand adapter 25 provided in this computer 30 is a piece of hardware for performing communications based on InfiniBand (refer to non-patent document 1) defined as I/O Standards developed for establishing high-speed a sever-to-server connection and a server-to-storage connection. Further, the InfiniBand driver 24 preinstalled in the computer 30 is a program for controlling the InfiniBand adapter 25.

The application program 21 is capable of utilizing, via the network management program 22, files and databases within other computers (each including the InfiniBand adapter 25) connected via a network to the computer 30 preinstalled with the application program 22 itself.

The network management program 22 serves to execute a process of packetizing pieces of information of which transmission is requested by the application program 21 into some packets each containing a virtual address of a destination and requesting the address translation program 23 to transmit each of the packets (packetized datagram), and a process of deassembling the packets transferred from the address translation program 23 back into the information in an original format and then transferring the information to the application program 21. Note that the virtual address (corresponding to Ethernet address; Ethernet is a trademark of Xerox Corp. in U.S.A.) is a 6-byte address virtually assigned to each of the InfiniBand adapters 25.

The network management program 22 is a program (for attaining a duplex system/redundant architecture of the network) capable of executing a process of automatically switching over the InfiniBand adapter 25 used for transmitting the packet if a trouble occurs in the transmission of the packet (such as a trouble occurred in the InfiniBand adapter 25 within the self-computer or in the InfiniBand adapter 25 in a computer as the destination of the packet, and so on).

The network management program 22 is, however, a program (that should be preinstalled into a computer including two pieces of Ethernet adapters) developed for the Ethernet network. Then, the network management program 22 preinstalled into the computer including the two Ethernet adapters executes a process of causing each Ethernet adapter to periodically broadcast a communication management packet (which will be described in detail later on) having a predetermined content and a process of causing the Ethernet adapter receiving the communication management packet in the self-computer to send a packet (which will hereinafter referred to as a response packet) having a predetermined content back to a source of the communication management packet in order to grasp the computer (preinstalled with the network management program 22) that is actually communicable via each of the Ethernet adapters.

The address translation program 23 is a program for making the network management program 22, defined as the Ethernet network program, usable for managing the InfiniBand network.

The address translation program 23 basically executes a process of requesting the InfiniBand driver 24 to transmit an address-translated packet of which the transmission is requested by the network management program 22 and of which two pieces of virtual addresses (a 6-byte source address and a 6-byte destination address) are translated into 20-byte addresses (which will hereinafter be called real addresses) for the InfiniBand network, and a process of transferring to the network management program 22 an address-translated packet, transferred from the InfiniBand driver 24, of which the respective real addresses (the 20-byte addresses) are translated into the virtual addresses (the 6-byte addresses). Note that the normal packet in the discussion herein, which is transferred and received between the address translation program 23 and the network management program 22, contains, as schematically shown in FIG. 11(a), an address length, a 6-byte destination address (the virtual address of the destination), a 6-byte source address (the virtual address of the source), an identifier (0x21) showing that the self-packet is identified with the normal packet, a data length showing a length of the subsequent data, and data. Further, the packet transferred and received between the address translation program 23 and the InfiniBand driver 24 contains, as schematically shown in FIG. 11(b), an address length, a 20-byte destination address (the real address of the destination), a 20-byte source address (the real address of the source), an identifier showing that the self-packet is identified with the normal packet, a data length, and data.

Then, the InfiniBand address is an address of which a value might be changed in the processing of being manipulated, and hence the address translation program 23 executes the above processes while performing the process of managing an associated relation (address mapping) between the virtual addresses and the real addresses.

To be specific, in a communication management packet (which will hereinafter be termed a second type communication management packet) that the network management program 22 requests the address translation program 23 (precisely, an instance, generated for the specified InfiniBand adapter 25, of the address translation program 23) to transmit, as schematically shown in FIG. 12(a), a virtual-address-formatted broadcast address (for the Ethernet network) is set as a destination address, a virtual address of the InfiniBand adapter 25 for transmitting the packet is set as a source address, and "0x20" showing that the self-packet is identified with the communication management packet is set as an identifier.

The address translation program 23, when requested to transmit the second type communication management packet, requests the InfiniBand driver 24 (precisely, the instance, generated for the specified InfiniBand adapter 25, of the InfiniBand driver 24) to transmit the first type communication management packet having a structure shown in FIG. 12(b). Namely, the address translation program 23 requests the InfiniBand driver 24 to transmit the first type communication management packet containing the identifier, the data length and the data of the second type communication management packet, the real addresses associated with the virtual address of the second type communication management packet, information (which will hereinafter be termed an address pair) consisting of the virtual address and the real address assigned to the InfiniBand adapter 25 for transmitting the packet, and the address length (–20).

Then, the address translation program 23 in each computer 30 receiving via the InfiniBand adapter 25 and the InfiniBand driver 24 the packet (which will hereinafter be also called the first type communication management packet) transmitted to the InfiniBand adapter 25 from the InfiniBand driver 24 requested to transmit the first type communication management packet, executes a process of updating contents of an address translation table managed for storing the associated relation (address mapping) between the virtual addresses and the real addresses on the basis of the address pair contained in the first type communication management packet, and a process of restoring the packet format (structure) back to the format in FIG. 12(*a*) and transferring this packet to the network management program 22.

As obvious from the description given above, the address translation program 23 used on the computer 30 is capable of grading up a computer performing the Ethernet-based communications by use of the network management program 22 into a computer performing the InfiniBand-based communications in the form of utilizing the network management program 22 as it is. This address translation program 23 might, however, cause a problem if the setting of the network management program 22 is erroneously manipulated.

Specifically, the network management program 22 is capable of designating a transmission request period of the second type communication management packet. Then, a process of changing the InfiniBand address is finished in approximately 100 msec., however, the address translation program 23 requests the InfiniBand driver 24 to transmit the InfiniBand communication packet only when already receiving the second type communication management packet (which has been reassembled into the first type communication management packet by the address translation driver 23) transmitted by the network management program 22 of the source computer 30 and when the address translation table contains the address pair of the destination. Therefore, in a network system configured by a plurality of computers 30, when changing an InfiniBand address of a certain InfiniBand adapter 25 in a certain computer 30, the process of changing the InfiniBand address is finished in approximately 100 msec, and nevertheless the InfiniBand adapter 25 whose InfiniBand address was changed can not be utilized unless there is an elapse of time corresponding to the second type communication management packet transmission request period set in the network management program 22 after the completion of changing InfiniBand address.

Moreover, in the network system configured by the plurality of computers 30, after booting the network management program 22 on the unspecified computer 30, this computer 30 is unable to perform the communications with other computers 30 unless there is the elapse of the time corresponding to the second type communication management packet transmission request period set in the network management program 22 on the aforementioned computer 30.

[Non-patent document 1] [InfiniBand Architecture Specification Volume 1 Release 1.0], InfiniBand Trade Association (IBTA), October, 2000.

SUMMARY OF THE INVENTION

It is therefore an object of the present invention to provide an address translation program utilized in such a form as the address translation program 23 is used, and capable of making a computer, on which the address translation program itself runs, operate as a device capable of dealing with a change, etc. of an address of a communication adapter at a high speed without depending on a setting content of a program corresponding to the network management program 22, and a readable-by-computer medium stored with such an address translation program.

It is another object of the present invention to provide a program utilizing method capable of utilizing an adapter driver such as the InfiniBand driver 24 from a network management program such as the network management program 22 in a way that does not induce the problems described above.

It is a further object of the present invention to provide an information processing device installed with an adapter driver such as the InfiniBand driver 24 and with a network management program such as the network management program 22, and operating in a way that does induce the problems described above.

To accomplish the above objects, according to the present invention, an address translation program executed on a computer installed with an application program capable of utilizing a communication adapter, for performing communications based on a first type address, having its own first type address that might be changed, an adapter driver for controlling the communication adapter and resources of other computer, and further installed with a network management program for performing the communications having a content designated by the application program in a form based on a second type address and for periodically outputting a transmission request of a second type communication management packet having such a predetermined content that a second type address unique to a broadcast packet is set as a destination address in order to specify a communicable computer, is created to make the computer function as a device comprising address pair storage means for storing an address pair defined as information containing the first type address and the second type address assigned to the communication adapter in relation to each of the communication adapter within the self-computer and several pieces of communication adapters within other computers, transmission packet processing means for setting, as a destination address, the first type address unique to a broadcast packet when the network management program outputs the transmission request of the second type communication management packet by use of the information stored on the address pair storage means, requesting the adapter driver to transmit the first type communication management packet defined as a packet containing the address pair with respect to the communication adapter within the self-computer, and requesting the adapter driver to transmit, when the network management program outputs a transmission request of a packet different from the second type communication management packet, a packet of which the second type address is translated into the first type address related to the same communication adapter, communication management packet transmission frequency adjusting means for outputting the transmission request of the first type communication management packet to the adapter driver when a designated period of time elapses without outputting the transmission request of the second type communication management packet by the network management program, and receipt packet processing means for executing a process of assembling, when the adapter driver supplies a packet received by the communication adapter and different from the first type communication management packet, a packet of which the first type address is translated into the second type address related to the same communication adapter by use of the information stored on the address storage means, supplying the thus assembled packet to the network management program, storing, when the adapter driver supplies the first type communication management packet received by the communication adapter, the address storage means with an address pair contained in the first type communication management packet and storing the address storage means with no such address pair that only one of the first type address and the second type address is coincident with that of the former address pair, and executing a process of supplying the network management program with the second type communication management packet having a content associated with the first type communication management packet.

In short, the address translation program has a function (a function of instructing the adapter driver to transmit the first type communication management packet) of spontaneously outputting the transmission request of the second type communication management packet to the adapter driver if the first type communication management packet transmission request period by the network management program is long (or if the network management program does not output the transmission request of the first type communication management packet at all). Hence, the use of this address translation program enables the computer to operate as a device capable of dealing with a change, etc. of the address of the communication adapter at a high speed without depending on a setting content of the network management program.

Note that when actualizing the address translation program according to the present invention, for enabling the address change in the communication adapter to be handled at the high speed, it is desirable that the communication management packet transmission frequency adjusting means be set as means for outputting the transmission request of the second type communication management packet to the adapter driver when the designated period of time elapses without outputting the transmission request of the second type communication management packet by the network management program and when the first type address of the communication adapter is changed.

Then, in the program utilizing method according to the present invention, the adapter driver and the network management program are utilized under the control taking the same procedure as under the control effected by the address translation program according to the present invention. Accordingly, through the use of the program utilizing method according to the present invention, it is possible to utilize the adapter driver and the network management program in a way that can handle the address change, etc. in the communication adapter at the high speed without depending on the setting content of the network management program. Furthermore, the information processing device according to the present invention is a device equivalent to a computer on which the address translation program of the present invention runs. Hence, the information processing device of the present invention functions as a device capable of handling the address change, etc. in the communication adapter at the high speed without depending on the setting content of the network management program.

According to the present invention, it is feasible to handle the address change, etc. in the communication adapter at the high speed without depending on the setting content of the network management program.

BRIEF DESCRIPTION OF THE DRAWINGS

FIG. 12 is an explanatory diagram showing a communication management packet transferred and received between the existing address translation program and the existing network management program.

DETAILED DESCRIPTION OF THE PREFERRED EMBODIMENT

A best mode for carrying out the present invention will hereinafter be described in detail with reference to the drawings.

Figure 1:
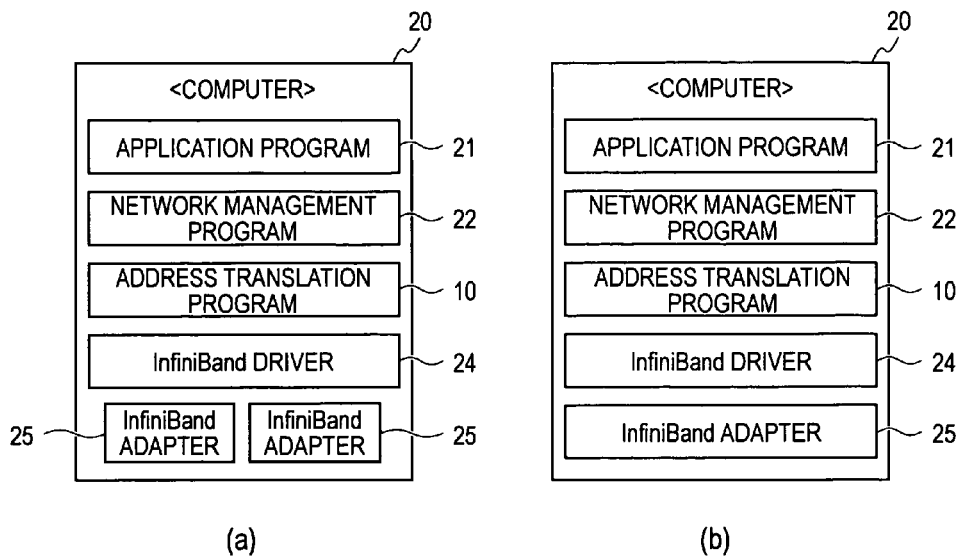
FIG. 1 is an explanatory diagram showing a usage mode of an address translation program according to one embodiment of the present invention.

As schematically shown in FIGS. 1(a) and 1(b), an address translation program 10 according to one embodiment of the present invention is a program executed on a computer 20 including two pieces or a single piece of InfiniBand adapter(s) 25 and preinstalled with an application program 21, a network program 22, an InfiniBand driver 24, etc.

Figure 10:
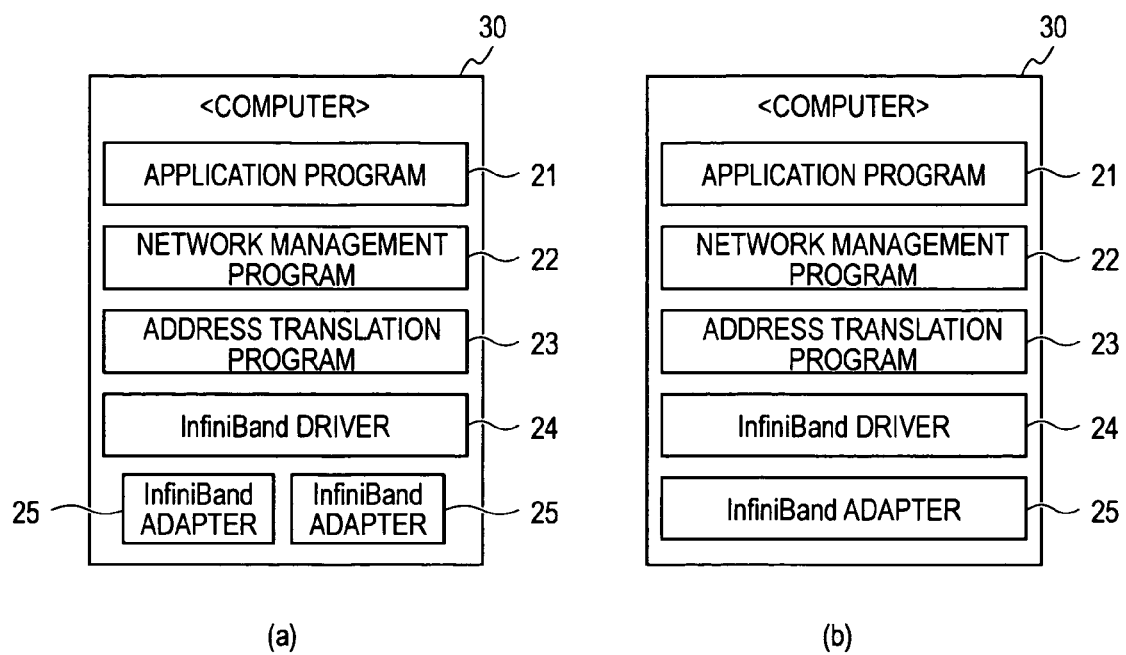
FIG. 10 is a diagram showing an architecture of an existing computer using the address translation program.

The application program 21, the network program 22, the InifiniBand driver 24 and the InifiniBand adapter 25, which are used on this computer 20, are each the same as those used on the computer 30 (FIG. 10). Therefore, the following discussion will deal with only functions of the address translation program 10.

Figure 11:
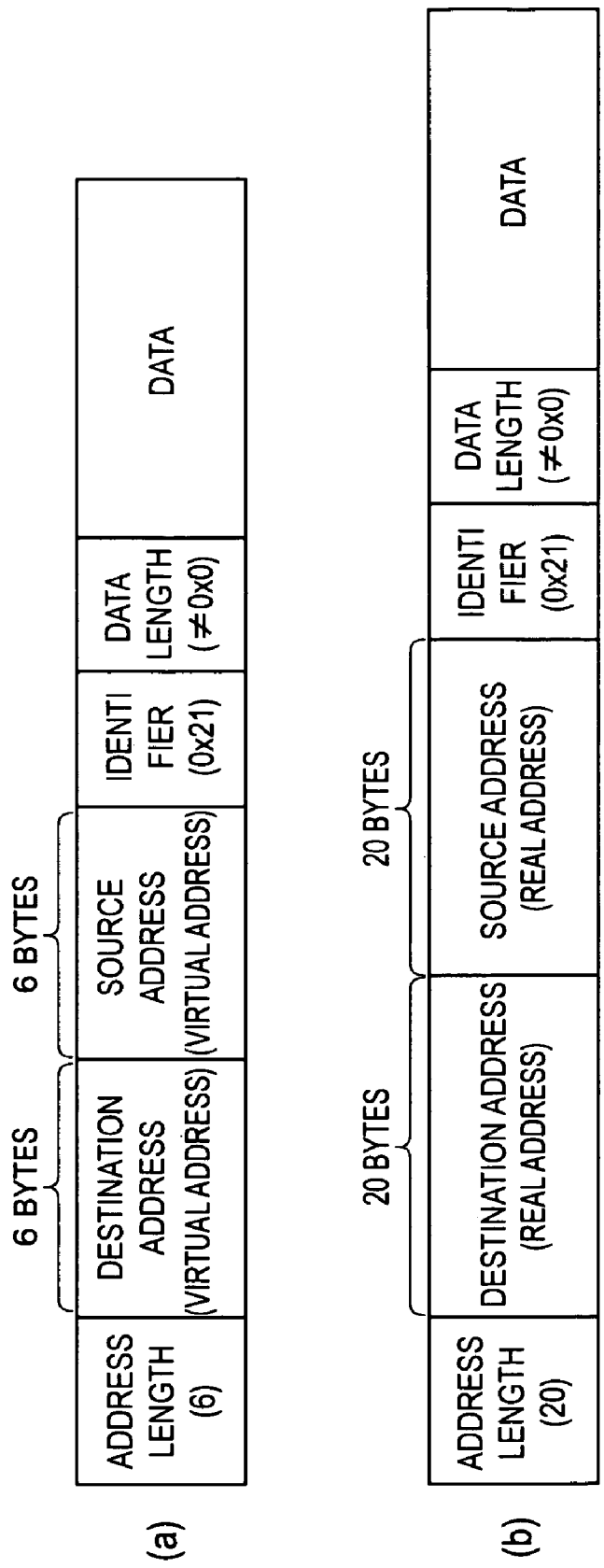
FIG. 11 is an explanatory diagram of a normal packet transferred and received between the existing address translation program and the existing network management program.

The address translation program 10 according to the present embodiment is a program for executing, as by the address translation program 23, a process of translating two pieces of virtual addresses (corresponding to a second type address according to the present invention) in a packet (see FIG. 11(a)) of which transmission is requested by the network management program 22 into real addresses (a 20-byte address for the InfiniBand network; an address corresponding to a first type address according to the present invention) and requesting the InifiniBand driver 24 to transmit the packet after the address translation, and a process of translating the real addressed in the packet (see FIG. 11(b)) transferred from the InfiniBand driver 24 into the virtual addressed and transferring the packet after the address translation to the network management program 22.

The address translation program 10 is different from the address translation program 23 in terms of a condition for outputting the transmission request of the first type communication management packet (see FIG. 12(b)) to the InfiniBand adapter 25.

Figure 2:
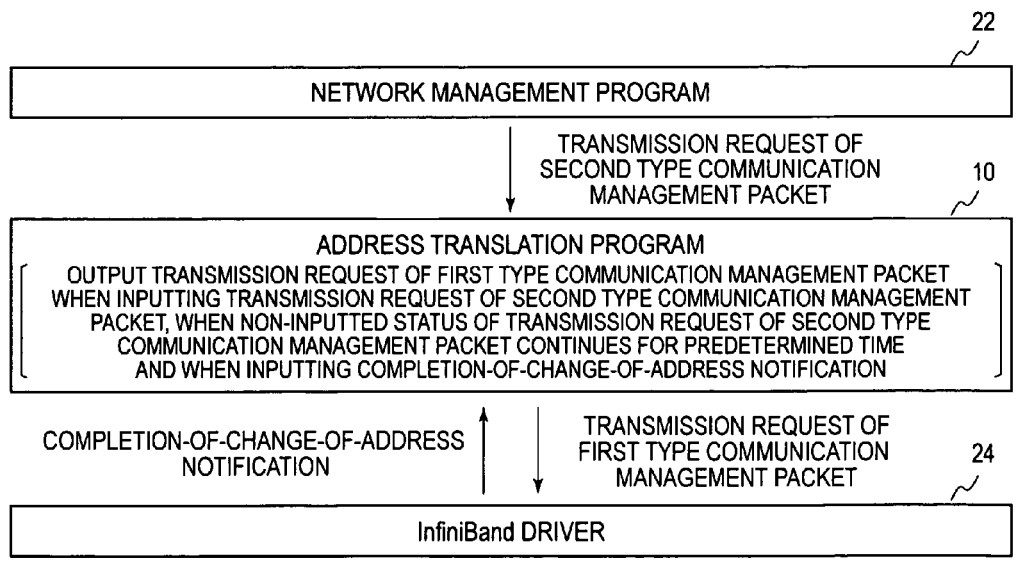
FIG. 2 is an explanatory diagram showing a function of the address translation program according to the embodiment.

To be specific, as schematically shown in FIG. 2, the address translation program 10 is created as a program for outputting the transmission request of the first type communication management packet to the InfiniBand adapter 25; (1) when the transmission request of the second type communication management packet (see FIG. 11(a)) is inputted from the network management program 22; (2) when a non-input status of the transmission request of the second type communication management packet continues for a preset designated or longer period of time (which is normally on the order of 200 msec.); and (2) when the InfiniBand driver 24 gives a completion-of-change-of-address notification representing that a change of the address of the InfiniBand adapter 25 is completed.

More specifically, the address translation program 10 functions as follows.

Figure 3:
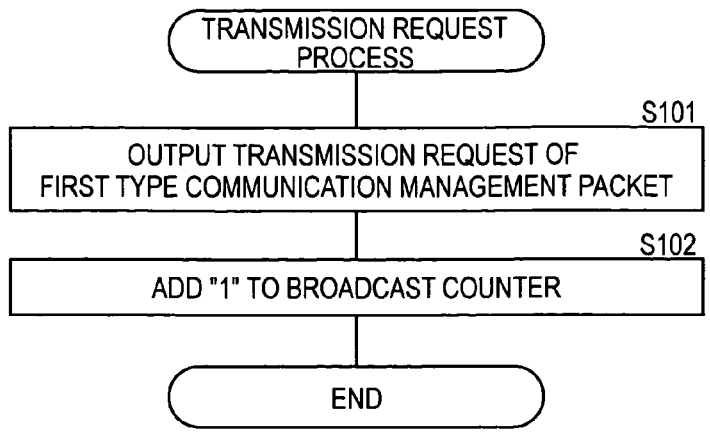
FIG. 3 is a flowchart showing a transmission request process executed when the address translation program according to the embodiment inputs a transmission request of a second type communication management packet.

The address translation program 10, when the transmission request of the second type communication management packet is inputted from the network management program 22, executes a transmission request process in a procedure shown in FIG. 3. Note that this transmission request process is a process (which is executed by an instance of the address translation program 10 generated for every InfiniBand adapter 25) executed with respect to each InfiniBand adapter 25.

Namely, the address translation program 10 starting the transmission request process as a result of the input of the transmission request of the second type communication management packet, at first outputs the transmission request of the first type communication management packet (see FIG. 12) to the IniniBand driver 24 (step S101). Then, the address translation program 10 adds "1" to a broadcast counter defined as numerical value information on the memory (S102), and thereafter terminates the transmission request process.

Figure 4:
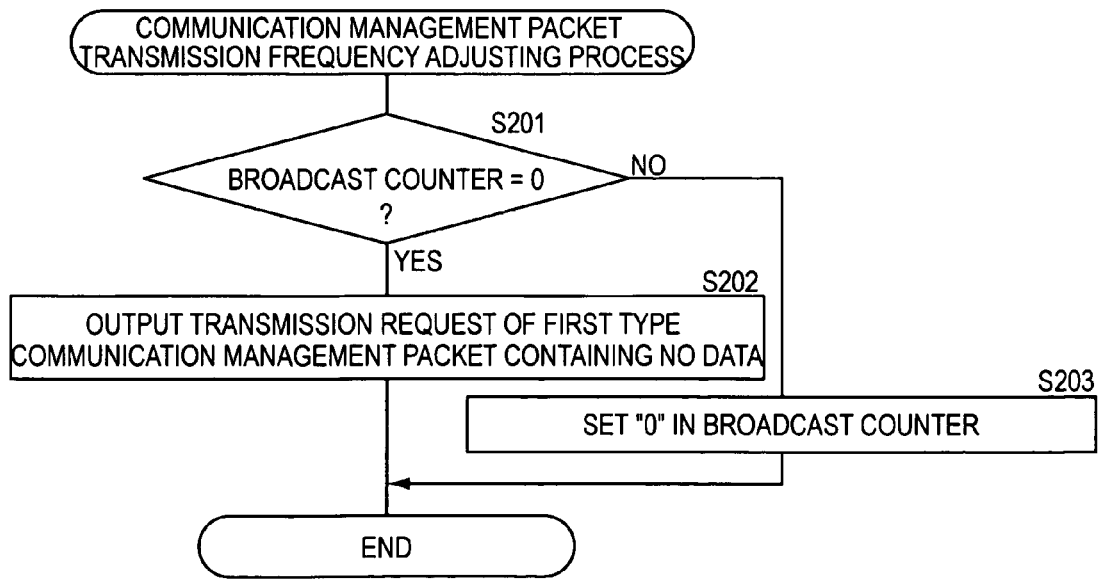
FIG. 4 is a flowchart showing a communication management packet transmission frequency adjusting process executed periodically by the address translation program according to the embodiment.

Moreover, the address translation program 10 executes a communication management packet transmission frequency adjusting process in a procedure shown in FIG. 4 each time the preset designated time (which is normally on the order of 200 msec.) elapses. Note that this communication management packet transmission frequency adjusting process is also a process executed by each InfiniBand adapter 25.

Figure 5:
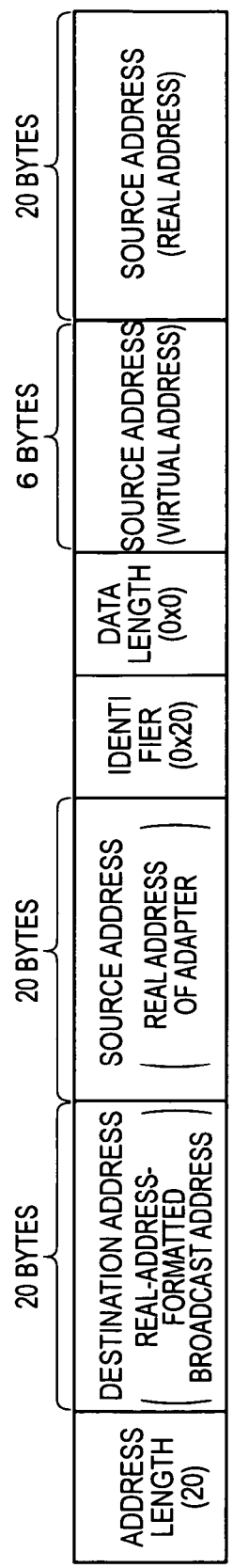
FIG. 5 is an explanatory diagram of the first type communication management packet of which a transmission is requested when executing the communication management packet transmission frequency adjusting process.

Namely, the address translation program 10 starting the communication management packet transmission frequency adjusting process as triggered by the elapse of the designated time, at first judges whether a value of the broadcast count is "0" or not (step S201). Then, if the value of the broadcast counter is not "0" (step S201; NO), i.e., if the transmission request process (FIG. 3) was executed till the communication management packet transmission frequency adjusting process is executed this time since the execution of the last time, the address translation program 10 sets "0" in the broadcast counter (step S203) and thereafter terminates this communication management packet transmission frequency adjusting process (this is a status of monitoring that the designated time elapses). Whereas if the value of the broadcast counter is "0" (step S201; YES), i.e., if the transmission request process is not yet executed till the communication management packet transmission frequency adjusting process is executed this time since the execution of the last time, the address translation program 10 outputs a transmission request of the first type communication management packet containing none of the data to the InfiniBand driver 24 (step S302). Namely, the address translation program 10 outputs the transmission request of the first type communication management packet having the structure shown in FIG. 5 to the InfiniBand driver 24. Then, the address translation program 10 terminates the communication management packet transmission frequency adjusting process.

Further, the address translation program 10, when the completion-of-change-of-address notification with respect to a certain InfiniBand adapter 25 is inputted from the InfiniBand driver 24, executes a process of updating (which will hereinafter be described in depth later on), into the latest address, the real address of the address pair (which is the information consisting of the real address and the virtual address) managed as the information about this InfiniBand adapter 25, and a process of instructing the InfiniBand adapter 25 of which the InfiniBand address was changed to transmit the first type communication management packet.

Figure 6:
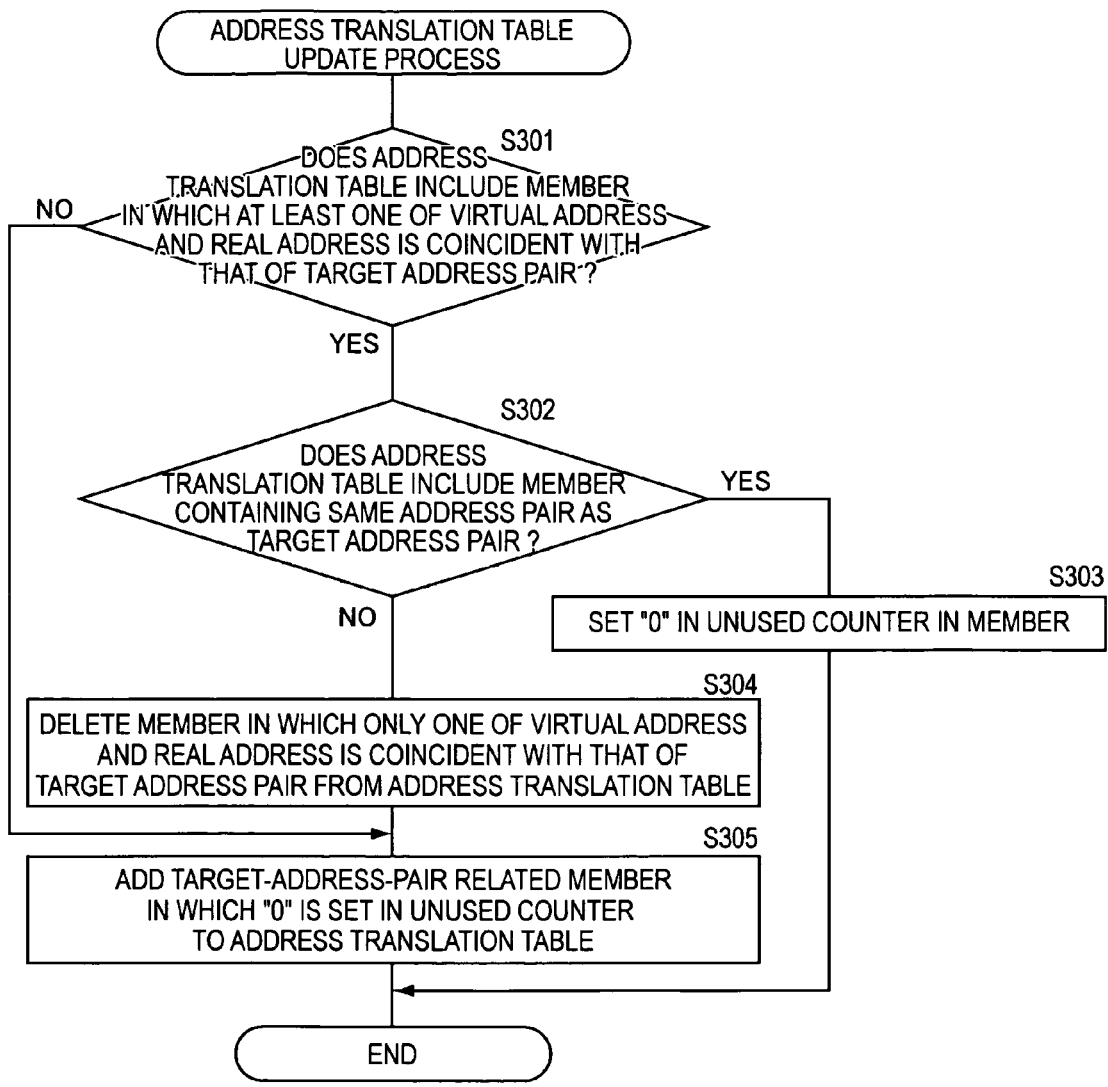
FIG. 6 is a flowchart showing an address translation table updating process executed when the address translation program according to the embodiment inputs the first type communication management packet.

Further, the address translation program 10, when the first type communication management packet received from the unspecified InfiniBand adapter 25 is inputted from the InfiniBand driver 24, executes a process of supplying the second type communication management packet associated with this first type communication management packet to the network management program 22, and simultaneously executes an address translation table updating process in a procedure shown in FIG. 6. Note that this address translation table updating process is also a process executed with respect to each InfiniBand adapter 25.

To be specific, the address translation program 10 starting the address translation table updating process as triggered by the input of the first type communication management packet, to start with, judges whether or not the address translation table contains a member (a low-order record) showing coincidence of at least one of the virtual address and the real address of the address pair (which will hereinafter be termed a focused (target) address pair) contained in the inputted first type communication management packet (see FIG. 12(b)) (step S301).

Figure 7:
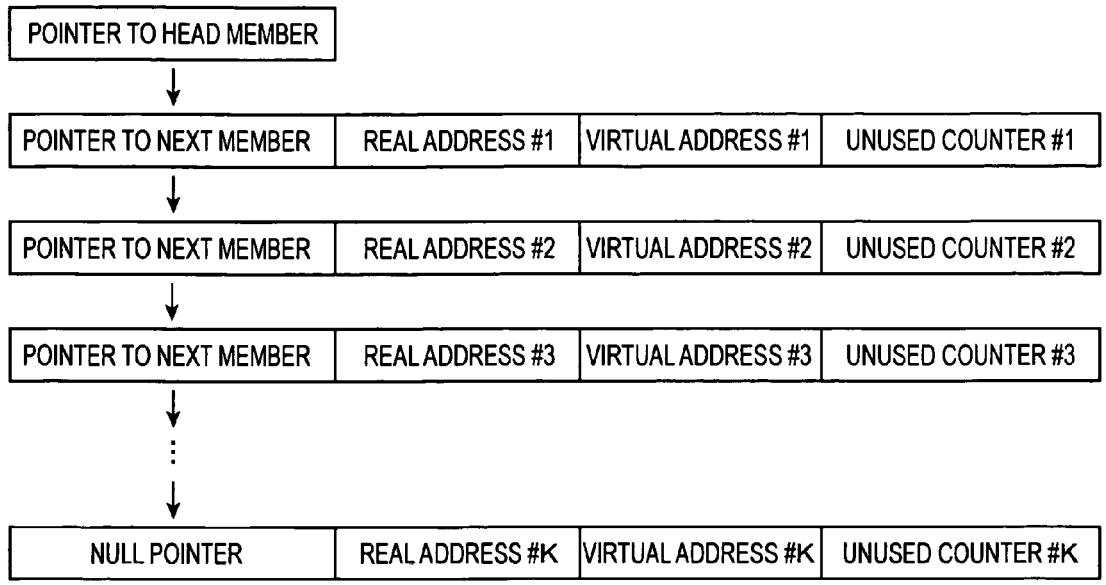
FIG. 7 is an explanatory diagram of an address translation table managed by the address translation program according to the embodiment.

Herein, the address translation table is a set of information to which the address translation program 10 refers when translating each real address contained in the packet transferred from the InfiniBand driver 24 into the virtual address and when translating each virtual address contained in the packet transferred from the network management program 22 into the real address. This address translation table is, as schematically shown in FIG. 7, a set of members (records) each containing the address pair (the information consisting of the real address and the virtual address), an unused counter and a pointer to a next member. Note that when booting the computer 20, the address translation program 10 reads a virtual address assigned to the InfiniBand adapter 25 from a HDD within a computer 30, and acquires a real address fort the InfiniBand adapter 25 from the InfiniBand driver 24, wherein a member containing an address pair consisting of these addresses is added to this address management table. Then, when inputting the completion-of-change-of-address notification described above, a content of the address pair about the self-computer (about the InfiniBand adapter 25 whose address was changed), which is stored in this address management table, is changed.

Figure 8:
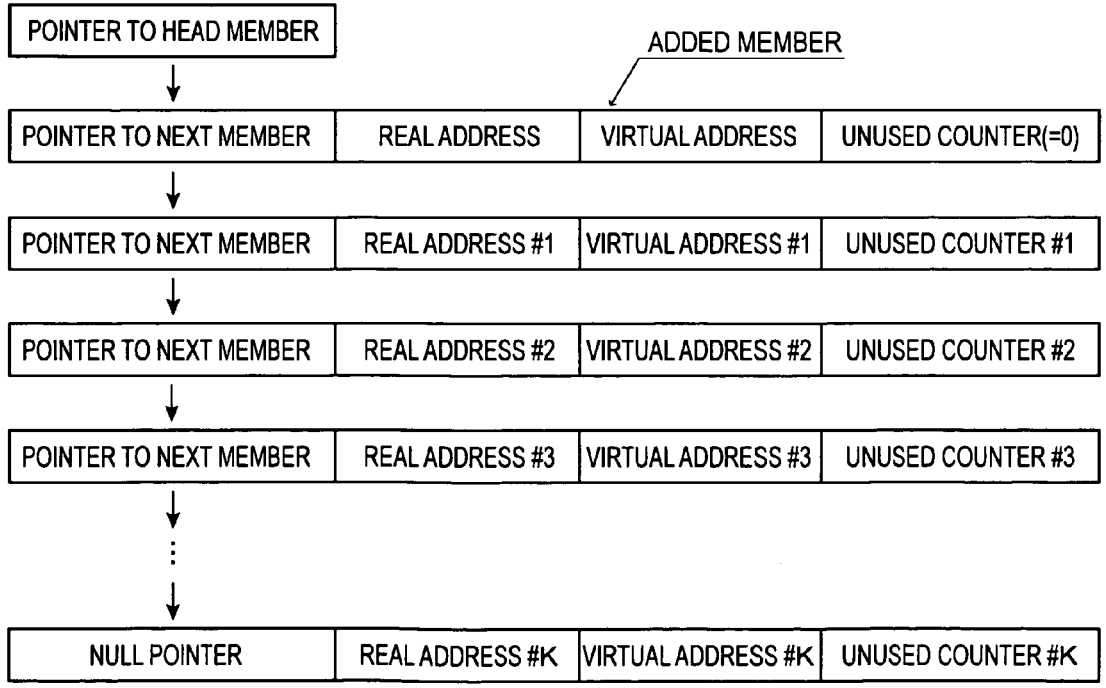
FIG. 8 is an explanatory diagram showing a method by which the address translation program according to the embodiment adds a member to the address translation table.

If the address translation table does not contain the member showing the coincidence of at least one of the virtual address and the real address of the target address pair (step S301; NO), the address translation program 10 sets an address pair having the same content as the target address pair has, and adds a member in which "0" is set in the unused counter to the address translation table (step S305). Note that a process in this step S305 is, as schematically shown in FIG. 8, a process executed in such a form that the added member becomes a head member in the address translation table.

Then, the address translation program 10 finishing the process in step S305 terminates this address translation table updating process.

Further, whereas if the address translation table contains the member showing the coincidence of at least one of the virtual address and the real address of the target address pair (step S301; YES), the address translation program 10 judges whether or not the address translation table has a member containing the same address pair as the target address pair (step S302). Then, the address translation program 10, if such a member exists in the address translation table (step S302; YES), executes a process of setting "0" as a value of the unused counter in this member (step S303), and thereafter terminates this address translation table updating process.

Whereas if the member containing the same address pair as the target address pair does not exist in the address translation table (step S302; NO), the address translation program 10 executes a process of deleting from the address translation table the member containing the address pair coincident with the target address pair with respect to only one of the virtual address and the real address (step S304), and a process of setting the same address pair as the target address pair and adding the member in which "0" is set in the unused counter to the address translation table (step S305), and thereafter terminates the address translation table updating process. Note that if branched off to the "NO" side in step S302, the member containing the address pair in which only one of the virtual address and the real address is coincident with that of the target address pair, is deleted from the address translation table, and this case (which is a processing flow of branching off to the "YES" side in step S301 and branching off to the "NO" side in step S302) is derived from a reason that the address translation table has the member containing the address pair (in which only one of the virtual address and the real address is coincident with that of the target address pair) having a content impossible of coexisting with the target address pair.

A final discussion will deal with an application of the unused counter.

Figure 9:
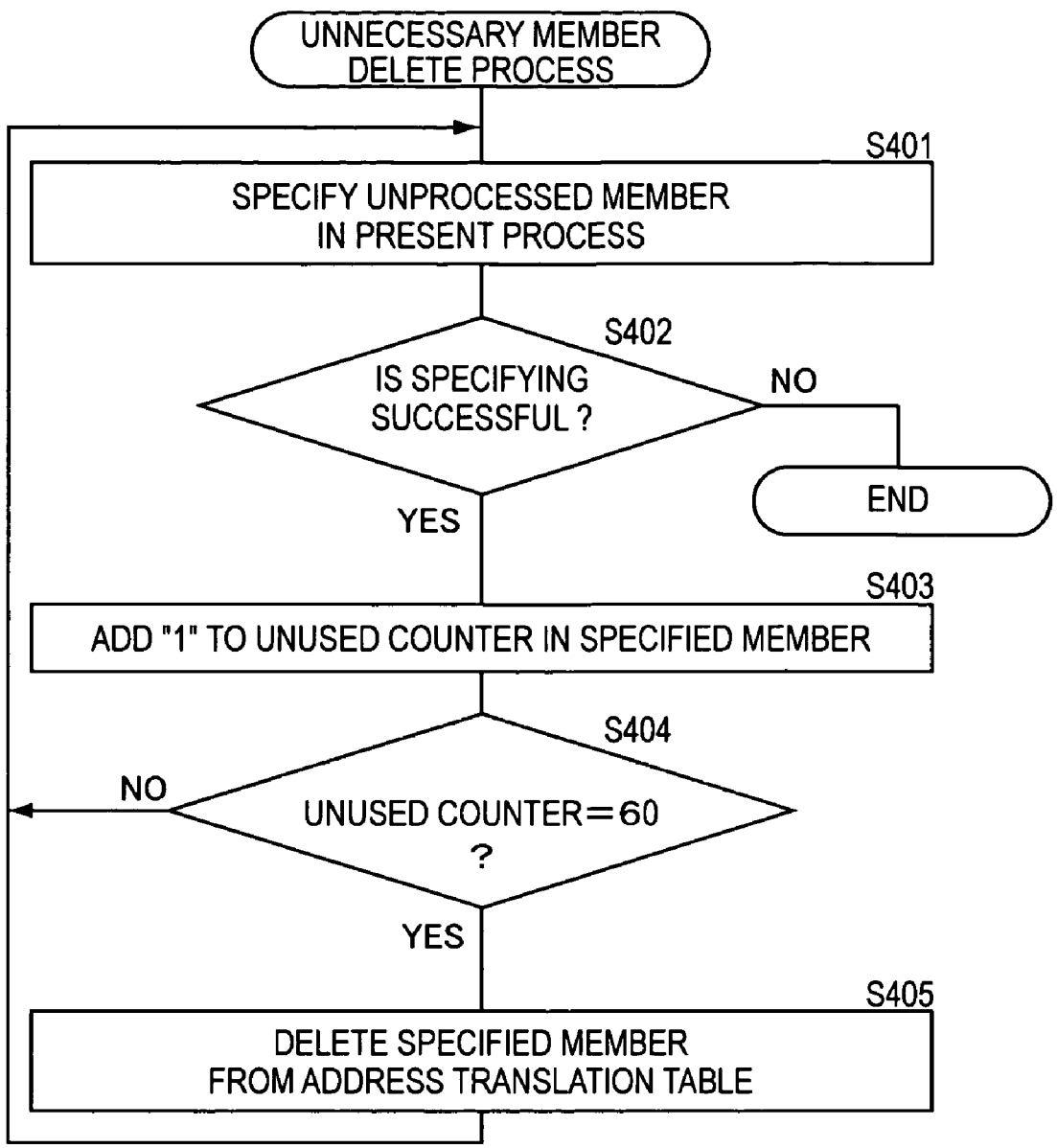
FIG. 9 is a flowchart showing an unnecessary member deleting process executed periodically by the address translation program according to the embodiment.

The address translation program 10, when performing the address translation using the address pair contained in the unspecified member in the address translation table, sets "0" in the unused counter in the member, and at the same time executes the process of deleting the unnecessary member in the procedure shown in FIG. 9 each time the pre-designated time (a period of time of approximately 5 sec; this will hereinafter be referred to as the predetermined time) elapses.

Namely, the address translation program 10 starting the unnecessary member delete process at first tries to specify an unprocessed member in the present process from within the address translation table (step S401). Then, the address translation program 10, if capable of specifying the unprocessed member (step S401; YES), adds "1" to the unused counter in the specified member (step S402), and thereafter judges whether a value of the unused counter is "60" or not (step S403). If the value of the unused counter is not "60" (step S404; NO), the processes from step S401 onward are restarted. Whereas if the value of the unused counter is "60" (step S404; YES), the address translation program 10 executes the process of deleting the member concerned from the address translation table (step S405), and thereafter restarts the processes from step S401 onward.

Then, the address translation program 10, when the unprocessed members disappear in the address translation table (step S402; YES), terminates this unnecessary member delete process.

In short, the unused counter (value) is the data contained in each member within the address translation table so that the member remaining unused for a fixed or longer period of time (the predetermined tim×60; 5 min in the case of setting the predetermined time to 5 min) is specified and can be deleted from within the address translation table.

As discussed above, the address translation program 10 according to the present embodiment has the function (which is a function of periodically executing the communication management packet transmission process) of spontaneously outputting the transmission request of the first type communication management packet to the InfiniBand driver 24 if the non-inputted status of the transmission request of the second type communication management packet from the network management program 22 continues for the designated or longer period of time. Moreover, the address translation program 10 also has the function of, in the case of changing the address of the InfiniBand adapter 25, immediately outputting the transmission request of the second type communication management packet to the Infiniband driver 24.

Accordingly, it follows that the computer 20 using (implementing) the address translation program 10 functions as a device capable of, when the address of the InfiniBand adapter 25 is changed, promptly notifying other computer 20 of this change without depending on the setting content about the transmission request frequency of the second type communication management packet of the network management program 22.

<Modified Mode>

The address translation program 10 described above can be modified in a variety of modes. For example, the address translation program 10 may remove its function of outputting the transmission request of the first type communication management packet to the InfiniBand driver 24 when changing the address of the InfiniBand adapter 25. If the address translation program 10 is modified as such, however, there might be a case of notifying other computer 20 of the address change when a designated period of time (e.g., 200 msec) elapses after completion of the address change. Hence, if desiring to reduce the non-communicable time to the shortest possible degree, the architecture of the address translation program 10 should be adopted.

Further, the address translation program 10 may be given a function as the InfiniBand driver 24 and may also be modified into a program suited to a protocol different from InfiniBand. Moreover, the specific structures of the address translation table and of the packet may be made different from those described above.

What is claimed is:

1. A system comprising a first information processing apparatus and a second information processing apparatus that is connected to the first information processing apparatus via a transmitting path, the first information processing apparatus is configured, to generate a communication request associated with the second information processing apparatus;

to output a first data having an address of a first form to the second information processing apparatus based on the communication request, and to periodically output a first communication management data having an address of the first form;

the second information processing apparatus is configured,
to receive the first data from the network management unit and convert the first data to a second data including an address of a second form and output the second data,
to receive the first communication management data from the periodic output and to convert the first communication management data to a second communication management data including an address of the second form based on an address pair including an address of the first form and an address of the second form in a memory unit and to output the second communication management data,
to generate and output a second communication management data when a time period has elapsed without receiving any first communication management data from the periodic output; and
to send the second data and the second communication management data to the transmitting path;

the address of the first form is a virtual address and the address of the second form is a real address.

2. A method for a first information processing apparatus connected to a second information processing apparatus via a transmitting path, comprising:
generating a communication request by the first information processing apparatus;
outputting a first data having an address of a first form to the second information processing apparatus based on the generated communicated request by the first information processing apparatus;
periodically outputting a first communication management data having an address of the first form by the first information processing apparatus;
receiving the first data by the second information processing apparatus from the outputting and converting the first data to a second data including an address of a second form, and outputting the second data by the second information processing apparatus;
receiving the first communication management data by the second information processing apparatus from the periodically outputting and converting the first communication management data to a second communication management data including an address of the second form based on an address pair including an address of the first form and an address of the second form in a memory unit and outputting the second communication management data, and generating and outputting a second communication management data by the second information apparatus when a time period has elapsed without receiving any first communication management data from the periodically outputting; and
sending the second data and the second communication management data to the transmitting path;
the address of the first form is a virtual address and the address of the second form is a real address.

3. A non-transitory computer-readable medium storing executable instructions, which when executed by a first information processing apparatus connected to a second information apparatus via a transmitting path, cause the first information processing apparatus to perform operations comprising:
generating a communication request for the second information apparatus;
outputting a first data having an address of a first form to the second information processing apparatus based on the generated communicated request; and
periodically outputting a first communication management data having an address of the first form;
the second information apparatus receiving the first data from the outputting and converting the first data to second data including an address of a second form and outputting the second data;
the second information apparatus receiving the first communication management data from the periodically outputting and converting the first communication management data to a second communication management data including an address of the second form based on an address pair including an address of the first form and an address of the second form in a memory unit and outputting the second communication management data, and generating and outputting a second communication management data when a time period has elapsed without receiving any first communication management data from the periodically outputting; and
the second information apparatus sending the second data and the second communication management data to the transmitting path; and
the address of the first form is a virtual address and the address of the second form is a real address.

* * * * *